May 25, 1954     W. D. LIVINGSTON ET AL     2,679,384
VIBRATOR

Filed Nov. 30, 1951     2 Sheets-Sheet 1

Inventors:-
William David Livingston,
Ronald Frank King,
by Pierce, Scheffler & Parker,
Attorneys.

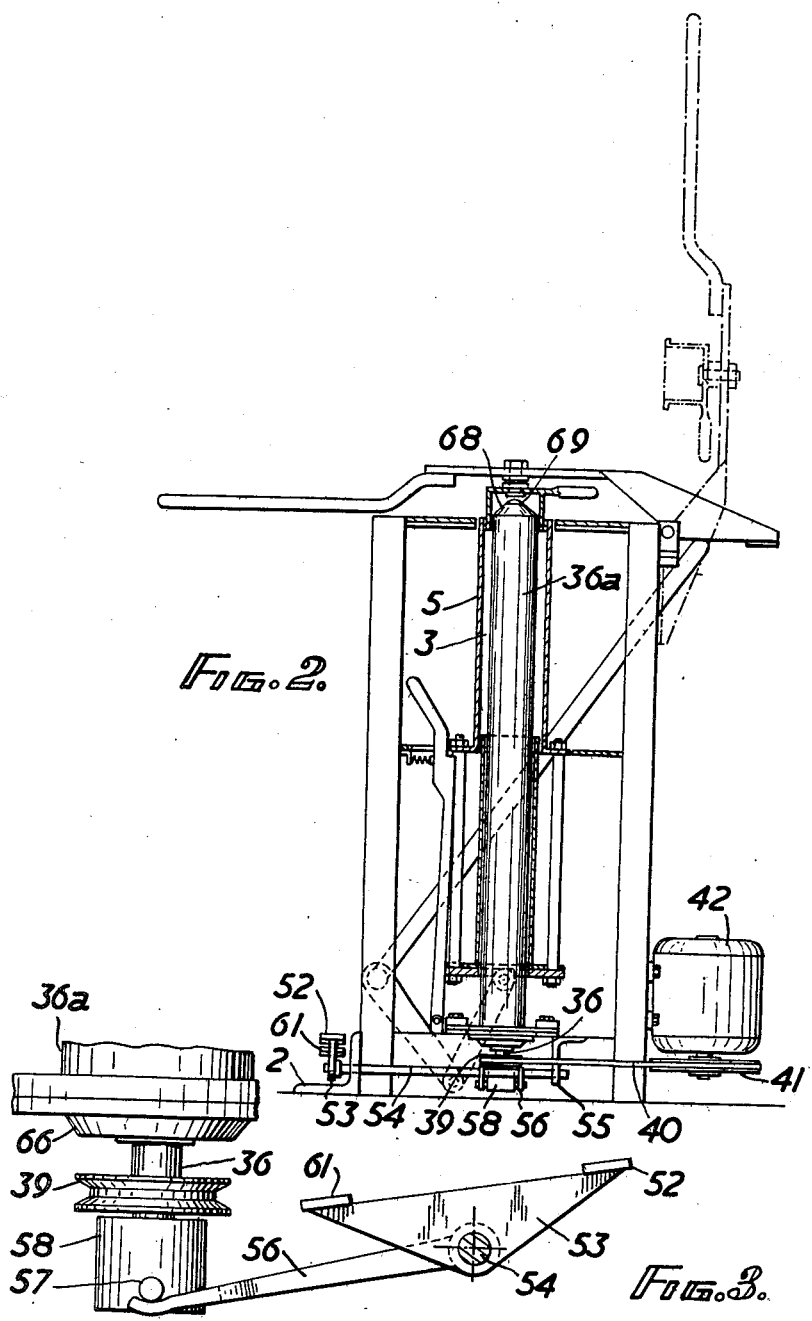

Patented May 25, 1954

2,679,384

UNITED STATES PATENT OFFICE 2,679,384

VIBRATOR

William David Livingston and Ronald Frank King, Thatcham, England, assignors to The Livingston Construction Company Limited, Thatcham, England Application November 30, 1951, Serial No. 259,032

Claims priority, application Great Britain December 6, 1950

7 Claims. (Cl. 259—1)

The present invention relates to vibrators of the type in which the weight or other vibratory member is movable into and out of the vibrating position to permit or interrupt vibration.

The object of the present invention is to provide an improved construction of vibrator of the above type and in which the movements of the weight or other vibratory member can be controlled mechanically at the will of an operator or automatically.

According to the invention a vibrator is provided wherein the weight or other vibratory member is adapted to be movable longitudinally of its axis of rotation in one direction to a position of vibration in which its axis lies at an angle to the said axis of rotation and in the opposite direction to a position in which its axis is in alignment with the axis of rotation to interrupt vibration.

The weight or other vibratory member may be pivotally mounted on an axis arranged transversely of its axis of rotation and be provided with a conical surface which upon longitudinal movement of the weight in one direction engages with co-acting surfaces to turn the weight about its transverse mounting to bring the axis of the weight into alignment with the axis of rotation to interrupt vibration, longitudinal movement in the opposite direction effecting disengagement of the conical surface of the weight from the co-acting surfaces to permit the weight to turn about the transverse mounting into the vibrating position.

In one construction of vibrator according to the invention the weight is pivotally mounted on a pivot pin arranged transversely on a driving shaft the driving shaft being adapted to be moved longitudinally of its axis of rotation in one direction to cause a conical surface provided on the weight to engage a co-acting conical surface formed in a bush surrounding the driving shaft, movement of the driving shaft in the opposite direction effecting disengagement between the co-acting conical surfaces to permit the weight to move into the vibrating position.

The vibrator can be used, for example, for the consolidation of cementitious mixes such as concrete, and for this purpose is contained within a tubular casing which is suitably sealed at either end to prevent the ingress of foreign matter to the vibrator.

In order that the invention may clearly be understood and carried into effect a vibrator and its application to a moulding machine for concrete pipes will now be described by aid of the accompanying drawings in which:

Fig. 2 is a side elevation of a machine of the type disclosed and claimed in the specification of our co-pending United States application Serial No. 259,031 for moulding concrete pipes and having a vibrator according to the present invention and Fig. 3 is a fragmentary view of a suitable form of operating mechanism for controlling the vibrator.

Figure 1:
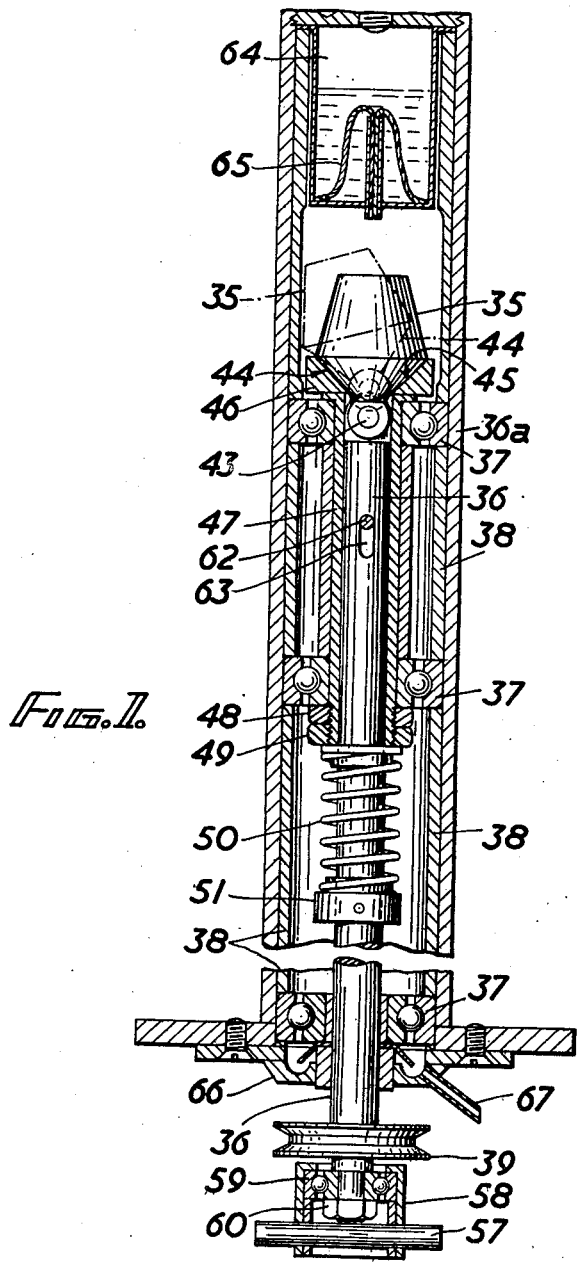
Fig. 1 is a sectional view of the vibrator.

As shown in Fig. 1 the vibrator consists of a weight 35 which is carried by the upper end of a shaft 36 arranged within the bore of tubular casing 36a. The shaft is rotatably mounted within spaced bearings 37 also mounted within the bore of the tubular casing 36a, the bearings being maintained in spaced relationship with one another by tubular distance pieces 38.

The lower end of shaft 36 projects out of the lower end of the bore of the casing 36a and is provided with a grooved pulley 39 which is adapted to be connected by band 40 to pulley 41 secured upon the output shaft of an electric motor 41 (see Fig. 2) or other suitable driving means.

To interrupt vibration the weight 35 is held in a position in which its axis is in alignment with the axis of the driving shaft 36 as shown in full lines in Fig. 1 and is capable of being turned out of this position to the position shown by the dotted lines for vibration.

For the above purpose the weight 35 is mounted on a pivot pin 43 carried by the upper end of the shaft 36 and is capable of being turned about this pivot pin by imparting longitudinal movement to the shaft 36, in a downward direction to interrupt vibration and in the opposite direction to permit vibration.

The longitudinal downward movement of the shaft 36 causes a conical surface 44 on the weight 35 to engage with a co-acting conical surface 45 formed in a bush 46 carried on the upper end of a sleeve 47 surrounding the shaft 36. This sleeve extends downwardly through the intermediate bearing 37 and is secured in position by a retaining nut 48 which is tightened up onto the underside of the inner race of this intermediate bearing and is locked in position by a lock nut 49, the downward movement of the shaft 36 being effected by a compression spring 50 surrounding the shaft the spring being compressible between the lock nut 49 and a bush 51 pinned to the shaft 36.

The weight 35 is thus normally held with its axis in line with the axis of the driving shaft and accordingly upon starting the electric motor or other driving member smooth and vibrationless running is obtained.

To start vibration the shaft 36 is moved upwardly against the action of spring 50 and this is effected by any suitable form of control either manually or automatically operated. The upward movement of the shaft 33 causes the weight 35 to fall out of center where it is held on the rim of the conical seating 45 by centrifugal force.

To stop vibration the driving shaft 36 is moved longitudinally in the opposite direction whereupon the weight 35 is drawn back into the conical seating 45 in which position it is held by the spring 50.

Upon stopping the electric motor or other driving means even with the weight 35 in the vibrating position, as the revolutions drop and centrifugal force decreases, the weight 35 is automatically returned to the non-vibrating position by the loading of spring 50, thus ensuring that the driving motor cannot be restarted with the weight in the vibrating position. Accordingly starting power is reduced and low speed vibrations which are damaging to the apparatus are avoided.

Drip lubrication of the vibrator is obtained from an oil pot 64 screwed into the upper end of the bore of the tubular casing 36a the lubricating oil from the oil pot being fed by a wick 65 to the bore of the said casing. The oil after its passage down through the bore is collected in a sump 66 provided at the lower end of the casing 36a, and from which it is delivered through a drain pipe 67 to a suitable reservoir, not shown.

The sump 66 forms a closure member for the lower end of the tubular casing 36a, and the upper end is also closed with a suitable closure plug or cover (not shown) thereby preventing the ingress of dust grit or dirt to the moving parts of the vibrator.

Fig. 2 shows the vibrator of the present invention as applied to a machine for moulding concrete pipes of the type disclosed in the specification of our co-pending application Serial No. 259,031, aforesaid.

In this machine the mould is formed by an annular space formed between a core member and an outer surrounding casing, the cement mix being fed into the annular space and then consolidated by subjecting the same to combined vibration and pressure.

As shown the tubular casing 36a containing the vibrator forms the core member and is surrounded by an outer casing 5, an annular space 3 being provided between the core member and the outer surrounding casing 5, the two latter members being mounted in the framework of the machine as described in the specification of our co-pending application above referred to.

The cement mix from which the pipes are moulded is fed into the annular space by a feed chute, not shown, and preferably the upper end of the casing 36a is closed by a closure plug or cover cap 68 of conical shape and which is secured in position by a screw 69 having a domed head the surface of which fairs out into the conical shape of the cover cap, the conical shape of the cover cap thus assisting in guiding the cement mix from the outlet of the feed chute into the annular space.

In the machine shown in the drawings the vibrator is driven by an electric motor 42 bolted to the machine frame the output shaft of which is provided with a driving pulley 41 which is connected by a driving band 40 to the pulley 39 keyed to the lower end of the vibrating driving shaft 36. The movements of the weight 35 into and out of the vibrating position are as shown controlled by a foot pedal 53.

The foot pedal is mounted intermediate its length on one end of a shaft 54 rotatably mounted in spaced bearings carried respectively by one of the foot members 2 of the machine frame and a bracket 55 secured to the machine frame.

By depressing the pad 52 of the foot pedal a rotational movement is imparted to the shaft 54 which results in upward movement of the free ends of the arms of a fork 56 carried by shaft 54, the said free ends engaging with a cross bar 57 carried by a housing 58. The upward movement of the housing is transmitted to the shaft 36 through a bearing 59 secured to the lower end of the shaft 36 by a retaining nut 60.

By depressing pad 61 of the foot pedal 53 a downward movement is imparted to the shaft 36 to move the weight 35 back into engagement with the conical seating 45 in which position it is held as previously mentioned by the spring 50.

The longitudinal movements of the shaft 36 are limited in both directions by a transverse pin 62 which passes through a slot 63 formed in the shaft 36.

As it is necessary to operate the vibrator at high speed it is preferable that the driving motor should be operated continuously while the machine is in use and accordingly with the vibrator according to the present invention the vibrating action can if desired be interrupted at the termination of a moulding operation and restarted again without the necessity of stopping the electric motor or disconnecting the shaft 36 from the same.

What we claim is:

1. A vibrator for use in a machine for moulding concrete pipes or the like, said vibrator comprising a weight member, means for rotating said weight member about an axis of rotation and means for selectively shifting said weight member longitudinally of its axis of rotation while maintaining rotation thereof from a non-vibrative rotative position wherein the axis of said weight member is aligned with the said axis of rotation to a vibrative position wherein the axis of said weight member is disposed at an angle to said axis of rotation.

2. A vibrator for use in a machine for moulding concrete pipes or the like, said vibrator comprising a shaft arranged for rotation about its axis, a weight member, pivot means arranged transverse to the axis of said shaft and pivotally connecting said weight with said shaft, means providing a seat for said weight member wherein the axis of said weight member is maintained in alignment with the axis of said shaft, and means for obtaining a relative longitudinal displacement between said shaft and seat thereby to unseat and permit said weight member to tilt to a position wherein the axis thereof lies at an angle to that of said shaft.

3. A vibrator for use in a machine for moulding concrete pipes or the like, said vibrator comprising an elongated casing, a drive shaft arranged within and longitudinally of said casing for rotation about its axis, a weight member having a conical surface symmetrical about its axis arranged within said casing and connected pivotally to one end of said shaft by pivot means extending transverse to the axis of said drive shaft, means providing a recess within said casing coactive with the conical surface of said weight member to establish a seat for said conical surface wherein the axis of said weight member is aligned with the axis of said shaft thus to establish a non-vibrating position for said weight member, and means for disengaging the conical surface of said weight member from its seat thereby to permit said weight member to turn about said transverse pivot means into a vibratory position.

4. A vibrator as defined in claim 3 wherein said recess providing a seat for the conical surface of said weight member is constituted by a conical surface formed in a bush surrounding said drive shaft.

5. A vibrator as defined in claim 3 wherein the said means for disengaging the conical surface of said weight member from said recess is constituted by means connected with said drive shaft for shifting said shaft longitudinally and which further includes spring means coactive with and biasing said shaft longitudinally to a position wherein the conical surface of said weight member is seated in said recess.

6. A vibrator as defined in claim 5 wherein the means for selectively shifting said drive shaft longitudinally to seat or unseat the conical surface on said weight member is operable manually.

7. A vibrator for use in a machine for moulding concrete pipes or the like, said vibrator comprising an elongated casing, a drive shaft arranged within and longitudinally of said casing for rotation about its axis, a weight member symmetrical about its longitudinal axis and having a conical surface also symmetrical about such axis, pivot means arranged transverse to the axis of said shaft and connecting said shaft with said weight member, a bush surrounding said shaft and having a conical recess providing a seat for the conical surface of said weight member wherein the axis of said weight member is aligned with the axis of said shaft thus to establish a non-vibratory position of rotation for said weight member, spring means surrounding said shaft and biasing the same to a position wherein the conical surface of said weight member is seated in said recess, and means for displacing said shaft longitudinally against the counterforce of said biasing spring to unseat said weight member and permit the same to turn about said pivot means to a vibratory position of rotation.

References Cited in the file of this patent

UNITED STATES PATENTS

| Number | Name | Date |
|---|---|---|
| 1,242,824 | Lindsay | Oct. 9, 1917 |
| 1,747,555 | Pelton | Feb. 18, 1930 |
| 2,524,676 | Nielsen | Oct. 3, 1950 |
| 2,544,453 | Gaudin | Mar. 6, 1951 |

FOREIGN PATENTS

| Number | Country | Date |
|---|---|---|
| 494,714 | Great Britain | Oct. 24, 1938 |